United States Patent [19]

Osborn et al.

[11] Patent Number: 5,494,141
[45] Date of Patent: *Feb. 27, 1996

[54] VEHICLE PARK/LOCK MECHANISM

[75] Inventors: Charles Osborn, Spring Lake; Robert M. Medema, Muskegon, both of Mich.

[73] Assignee: Grand Haven Stamped Products, Div. of JSJ Corporation, Grand Haven, Mich.

[*] Notice: The term of this patent shall not extend beyond the expiration date of Pat. No. 5,402,870.

[21] Appl. No.: 331,358

[22] Filed: Oct. 27, 1994

Related U.S. Application Data

[63] Continuation-in-part of Ser. No. 63,241, May 18, 1993, Pat. No. 5,402,870.

[51] Int. Cl.$^6$ .................................................. B60K 41/26
[52] U.S. Cl. ............................ 192/4 A; 74/475; 74/483 R
[58] Field of Search ........................ 192/4 A; 74/475, 74/483 R, 520, 527; 70/245, 247, 248; 180/271; 335/228, 229, 230

[56] References Cited

U.S. PATENT DOCUMENTS

| | | |
|---|---|---|
| 2,890,581 | 6/1959 | Lewis . |
| 2,915,681 | 12/1959 | Troy ........................ 335/229 X |
| 3,939,940 | 2/1976 | Sasabe et al. . |
| 4,246,989 | 1/1981 | Kohler . |
| 4,880,092 | 11/1989 | Kito et al. . |
| 4,905,802 | 3/1990 | Gotoh . |
| 4,930,609 | 6/1990 | Bois et al. . |
| 4,932,493 | 6/1990 | Sakurai et al. . |
| 4,966,262 | 10/1990 | Mieczkowski . |
| 5,018,610 | 5/1991 | Rolinski et al. . |
| 5,129,494 | 7/1992 | Rolinski et al. . |
| 5,167,308 | 12/1992 | Osborn . |
| 5,181,592 | 1/1993 | Pattock . |
| 5,211,271 | 5/1993 | Osborn et al. . |
| 5,272,458 | 12/1993 | Hoffman et al. ............. 335/229 X |
| 5,402,870 | 4/1995 | Osborn ........................... 192/4 A |

FOREIGN PATENT DOCUMENTS

| | | |
|---|---|---|
| 1203756 | 4/1986 | Canada . |
| 246353 | 11/1987 | European Pat. Off. . |
| 300268 | 1/1989 | European Pat. Off. . |
| 347150 | 12/1989 | European Pat. Off. . |
| 400727 | 12/1990 | European Pat. Off. . |
| 3943011 | 6/1990 | Germany . |
| 59-176253 | 11/1984 | Japan . |
| 60-23427 | 2/1985 | Japan . |
| 4-60270A | 2/1992 | Japan . |

*Primary Examiner*—Richard M. Lorence
*Attorney, Agent, or Firm*—Price, Heneveld, Cooper, DeWitt & Litton

[57] ABSTRACT

A vehicle transmission shifter in which a locking member is movable along aligned and opposite directions to a locked or unlocked position. A mechanical advantage means, preferably a toggle joint, is connected to one end of the locking member for either restraining or moving the locking member in response to the electromagnetic attracting and repelling force. One of the magnetic attracting or retracting forces causes the locking member to move and be held in the locked position and the other of the magnetic attracting or retracting force causing the locking member to be moved to an unlocked position.

27 Claims, 3 Drawing Sheets

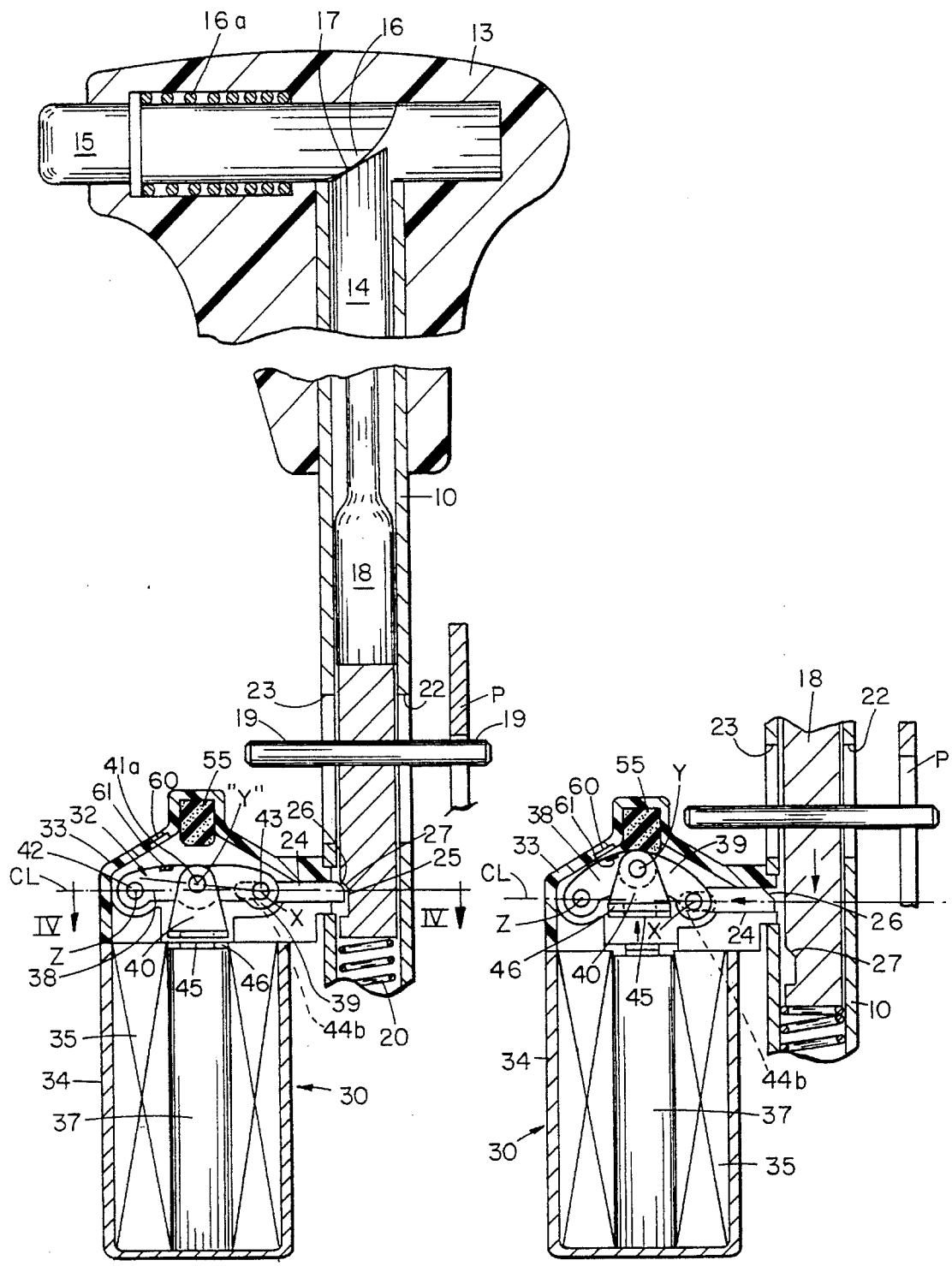

VEHICLE PARK/LOCK MECHANISM

This invention relates generally to a locking mechanism for controlling the shifting of a lever for an automatic transmission and more particularly, such locking mechanism for locking the shift lever in a park position against rotation to other gear positions. More specifically, this invention relates to an improvement in the locking mechanism of co-pending patent application Ser. No. 08/063,241 filed on May 18, 1993, and entitled "VEHICLE PARK/LOCK MECHANISM" now U.S. Pat. No. 5,402,870, of which this patent application is a continuation-in-part.

BACKGROUND OF THE INVENTION

In co-pending application Ser. No. 08/063,241 and in U.S. Pat. No. 5,096,033, issued on Mar. 17, 1992, the problems that have been encountered in the unattended acceleration of a vehicle in shifting from the park position to the other gear positions were explained. Such problems prompted efforts which have been made to prevent the shifting of the shift lever until the brake pedal had been depressed so that the vehicle does not move before it is intended by the driver. U.S. Pat. No. 5,096,033 discloses an electrically operated control module mounted on a detent plate and having a pin movable between a distended position to an extended position. This control module is controlled by the application or nonapplication of the brakes of the vehicle in which the shifter is mounted. When the brakes are not applied, the pins are to an extended position which prevents a lockout arm from being moved by the actuation of the pawl actuator and, accordingly, the pin, when extended, prevents the shifting of the shift lever. However, when the pin is distended by applying the brakes, it is located out of the path of the lockout arm, permitting the actuation of the pawl and the shifting of the shift lever from park position to other gear positions.

In the co-pending application Ser. No. 08/063,241, it was pointed out that there are other types of lockout mechanisms that have been devised. One such suggested mechanism was to mount an electrically operated control module having a pin movable between a distended position to an extended position on the tube of a shift lever. In such mechanism, the pin was movable in response to the energization of the coil of the module to an extended position and into the path of pawl actuator. The pin actually was an armature forced by the magnetic field of the coil into a notch formed in the side of the pawl actuator locking the pawl actuator against movement by the driver. Both the pin and the notch included angled sides which engaged each other so that when the coil was not energized, the pin was cammed out of the way of the pawl actuator permitting the driver to move the pawl out of the park/lock position. In this proposed design, the axial center of the coil of the module in the pin extended along an axis parallel to the pawl actuator and the pin was held in the notch of the pawl actuator by a magnetic force and was withdrawn from the notch by a spring. This arrangement resulted in a temporary binding force between the pawl actuator and the pin which gave an undesirable feel to the driver. As a result, it was contemplated to provide two similar modules spaced one above the other in an attempt to eliminate such binding. Such previous design also had the decided disadvantage of cost in requiring constant energization of the coils during the park/lock condition of the shifter.

Co-pending patent application Ser. No. 08/063,241, of which this application is a continuation-in-part, discloses a simplified, lower cost version of a brake/park lock mechanism for preventing a driver from shifting a shift lever from park position to another gear position unless the brake is applied. Such device includes the combination of a locking member and mechanical advantage means for actuating the locking member by applying a force on the mechanical advantage means in a direction substantially orthogonal to the direction of the movement of the locking member. Such combination takes advantage of the lesser force required to move the locking member into locked position, and the greater force exerted by the mechanical advantage means in holding the locking member in locked position.

More specifically, the device of application Ser. No. 08/063,241 discloses a unique mechanical advantage means which comprises a toggle joint operatively connected between the actuator of the electrical module and the locking member, thus utilizing the mechanical advantage of the toggle joint. Therefore, in the locked position of the locking member, the toggle joint is capable of withstanding the inadvertent force a driver might exert on the pawl actuator without applying the vehicle's brakes. The toggle mechanism includes at least two links which are pivotally connected together at one of their ends at a point referred to hereinafter as the "knee." At their other ends, one of the links is pivoted about a fixed axis and the other end of the link is slidable and connected to the locking member. When the two links are aligned or nearly aligned with the pivotal axis of the knee on the center line between the pivotal axes of the other ends of the links, the force required on the locking member substantially along such center line to pivot the two links is tremendous. However, if the pivotal axis or knee of the two links is moved a sufficient distance off center in one direction, the two links can be pivoted relative to each other with very little force on the locking member. Thus, as the distance between the center line and the axis of the knee between the two links increases, the amount of force required to move the pawl actuator decreases.

The device of application Ser. No. 08/063,241 takes advantage of the above phenomenon by applying a force to the knee between the links toward the center line by a biasing means such as a spring, until the knee reaches the center line or slightly beyond where it abuts against a stop. At such position, the locking member is immovable until the module actuator, which is movable in response to the coil of the module and is connected to the toggle joint at the pivotal axis or knee between the two links, pulls the knee away from the center line, thus greatly reducing the restraining force of the toggle.

The present invention also takes advantage of the above phenomenon by applying a force to the knee between the links in a direction toward the center line by a permanent magnetic force until the axis of the knee reaches a position slightly above the center line. At such position, the locking member is immovable until a repelling magnetic force is exerted on the knee to force the knee away from the center line, thus greatly reducing the restraining force of the toggle and, in fact, moving the locking member to an unlocked position.

The magnetic attracting and repelling forces exerted on the knee between the links toward and away from the center line are created by a permanent magnet associated with the module actuator. The polarized permanent magnet is attracted to a metal core surrounded by a coil that is energized in response to the application of the brakes of the vehicle. Thus, in the locked position of the knee of the toggle joint, the permanent magnet is attracted to the metal core to move and hold the locking member in locked position.

However, when the coil is energized, it changes the magnetic pole at the end of the metal core, causing the polarized permanent magnet to be repelled and thus, the central axis of the knee to be forced away from the center line so as to reduce the restraining force of the toggle and, in effect, withdraw the locking member out of the locked position.

Having briefly described the physical features of the invention, the following drawings with the more detailed description will serve to explain the concepts and principles of the invention.

BRIEF DESCRIPTION OF THE DRAWINGS

FIG. 2 is an enlarged, cross-sectional, side-elevational view of the invention, such view being a reverse side of that shown in FIG. 1 and disclosing in more detail the invention with the locking member in locked position;

FIG. 3 is a cross-sectional, side-elevational, partial view of FIG. 2 but disclosing the locking member in unlocked position;

DESCRIPTION OF THE PREFERRED EMBODIMENT

Figure 1:
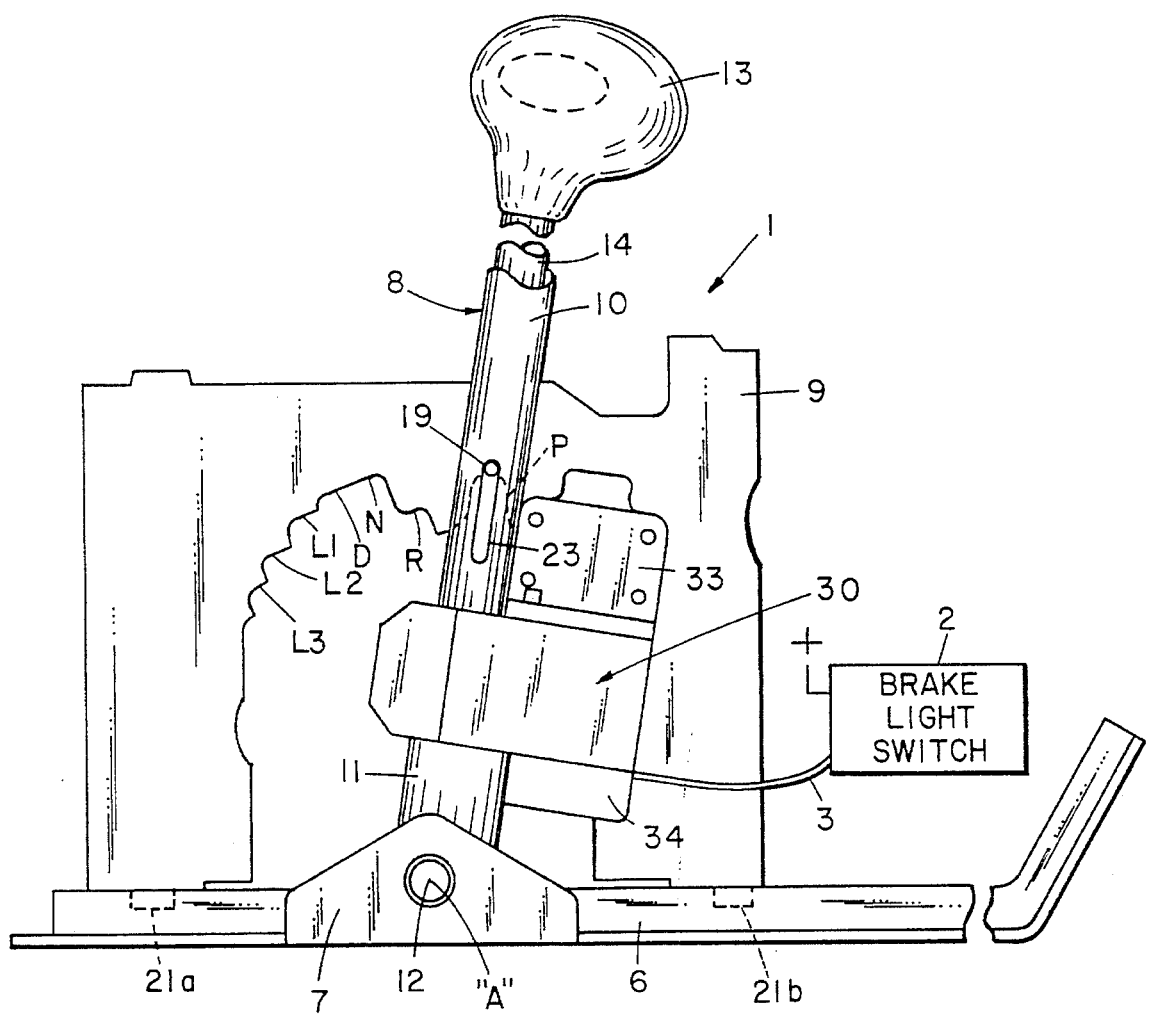
FIG. 1 is a sketchy, side-elevational view of the shifter of this invention without the cable brackets.

Referring to the drawings, and particularly to FIG. 1, reference numeral 1 designates an automatic shifting mechanism for an automotive vehicle operatively connected to a brake-like switch 2 by an electric cord 3. It should be understood that this automatic shifting mechanism can be utilized in any system as disclosed in U.S. Pat. No. 5,096,033, which is incorporated herein by reference, although it can be used in many different systems wherein a park/lock is to be made responsive to a predetermined condition of the motor vehicle.

Shifting mechanism 1 includes a base 6 having a pair of spaced ears 7 supporting the shift lever 8 about the axis "A." The base also supports the upright detent plate 9.

Shift lever 8, as disclosed in FIGS. 1–3, is of a conventional type which includes a tube 10 secured at its lower end to the housing 11 which, in turn, is pivoted about the axis "A" by an axle 12 extending between the two ears 7. Housing 11 is pivotally mounted for pivoting the shift lever 8 to different gear positions.

A handle 13 is secured to the top of the tube 10 and provides a housing with means for actuating the pawl actuator 18 which is biased upwardly in the tube 10 by a spring 20 extending upwardly from the housing 11. The means for actuating pawl actuator 18 includes a rod 14 contacting the button 15 slidably mounted within the handle 13. The inclined camming surface 16 of button 15 contacts the inclined cam surface 17 of a rod 14 so that when the button 15 is depressed to overcome the bias of spring 16a, the rod or shaft 14 is forced downwardly. The pawl actuator 18 is located below the rod 14 and supports the pawl 19 which holds the shift lever 10 in various gear positions as established by the detent plate 9.

The pawl 19 extends through the pawl actuator 18 and extends through the slots 22 and 23 on each side of the tube 10. The pawl is thus movable downwardly through the slots 22 and 23 from the position as disclosed in FIG. 2 to the position of FIG. 3, respectively.

Detent plate 9 is an upright plate having tabs 21a and 21b extending through openings in the base 6 and secured in an upright position. Detent plate 9 has a central opening defining a series of notches designated by the letters "P," "R," "N," "D," "L1," "L2," and "L3." It is important that the park notch "P" is deeper than all of the remaining notches in order that the pawl is prevented from being locked in any other notch than in the park/lock notch. One exception to this is if it is desirable for some reason or another to lock the pawl in the neutral position as well as in the park position, in which event the depth of the notches in both the park and neutral position should be the same.

Figure 4:
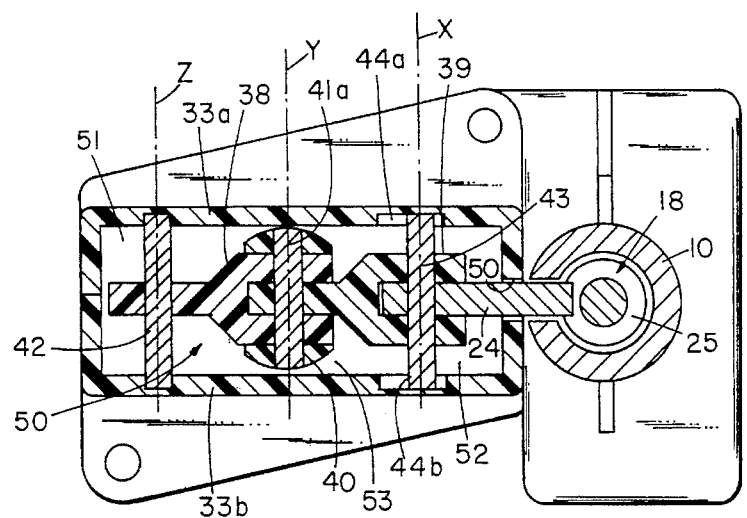
FIG. 4 is a cross-sectional view taken along the plane IV—IV of FIG. 2.

The structure for locking the locking member or pin 24 in the park/lock position is disclosed in FIGS. 2, 3, and 4 wherein the pin 24, which is the locking member, extends through opening 50 into a notch 25 cut into the side of the pawl actuator 18. Pin 24 has an inclined end surface 26, and notch 25 has an inclined surface 27. These inclined surfaces are provided to minimize binding and also provide a camming action whereby a force applied to pawl actuator 18 will assist in moving pin 24 to unlocked position at appropriate times. The position of the pin 24 is controlled by a module 30 which controls the magnetic attraction or repelling of the toggle linkage 32, which determines the locked or unlocked position of the pin 24. The module 30 is mounted on the side of the tube 10 and is accordingly movable with the shift lever 8.

Figure 6:
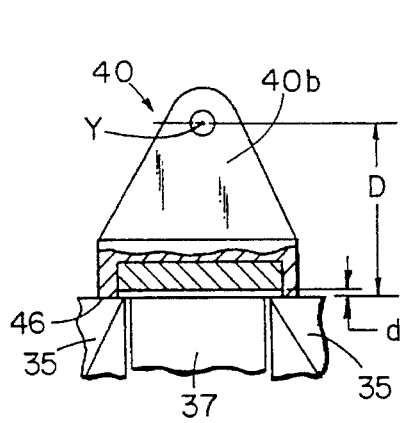
FIG. 6 is a side-elevational view of the actuator member which forms one of the links of the toggle mechanism.
Figure 7:
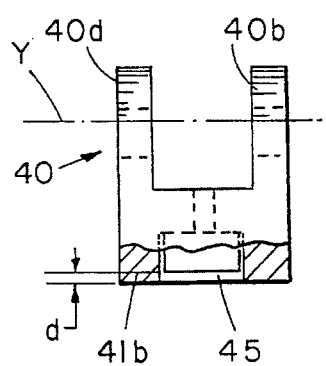
FIG. 7 is a side-elevational view of the actuator member or link of FIG. 6.

The toggle linkage 32 is mounted in housing 33 and comprises the three links 38, 39, and 40, all of which are pivotally connected together at one of their ends on the pin 41a about the axis "Y." The other end of link 38 is pivoted on the pin 42 about the fixed axis "Z." The other end of link 39 is pivotally mounted by the pivot pin 43 to the locking pin 24 for pivotal movement about the axis "X." The ends of pin 43 are slidable in the grooves 44a and 44b (FIG. 4). As disclosed in FIGS. 2 and 8, in the locked position of pin 24, the two axes "X" and "Z" are substantially aligned on center line "CL" with the axis "Y" located slightly above center line "CL." The distance of axis "Y" spaced above center line "CL" is governed by the bottom end 46 of link 40 abutting the top end of the coil 35 of module 34 which determines the distance "D" (FIG. 6). This distance is selected to provide the proper restraining force exerted by the toggle on pin 24, it being understood that as the axis "Y" moves away from the center line "CL," the amount of force required to move the locking pin 24 out of the locked position substantially decreases. Therefore, the slight spacing of axis "Y" above the center line "CL" is selected so that the restraining force on pin 24 prevents the driver from displacing the pin 24 toward the unlocked position by depressing button 15 while the brakes are not applied. In making this determination, it should be taken into account that in accordance with the well-known principles of mechanics, the force reduces measurably as the axis "Y" moves up. As a practical measure, the distance can be best determined by trial and error after estimates are determined by well-known formulas for toggle joints. We have found the spacing should fall within a distance wherein angle α between center line "CL" and a line drawn between "X" and "Y" is between one and three degrees (1°–3°) (see FIG. 8).

The distance "D" and angle α are selected so that there will always be some clearance between surface 26 and surfaces 25 and 27 when the toggle linkage 32 is in locked position with the shifter in park "P" position without anyone touching button 15 in knob 13. In other words, there is a small amount of play in the assembly.

Figures 5, 8:
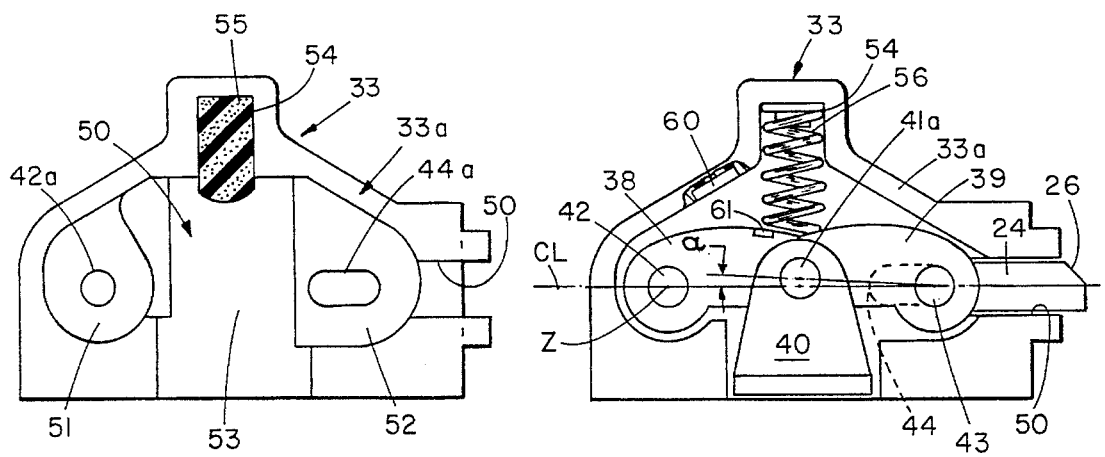
FIG. 5 is a side-elevational view of one part of the housing for the toggle mechanism, the other part forming the housing being a mirror image thereof.
FIG. 8 is a side-elevational, cutaway view of the toggle mechanism in which a spring has been added to assist in positioning the toggle mechanism in the closed position of the locking member.

Toggle linkage 32 is mounted in housing 33 which is a plastic molded housing constructed in either one or two parts. FIG. 4 discloses the housing 33 constructed of two parts 33a and 33b. FIG. 5 discloses part 33a of the two-part housing which includes a cavity 50 including a portion 51 for receiving link 38 and portion 52 receiving link 39. In the location of cavity portion 51, the wall of the housing includes a bore 42a for receiving shaft 42, and in the location of cavity portion 52, the wall of the housing includes a slot 44b for receiving shaft 43. Between the two cavity portions 51 and 52 is the portion 53 receiving the link 40 and into which the links 38 and 39 extend for connection to link 40. The cavity portions 51, 52, and 53 permit the movement of the linkage within the housing 33. The housing 33 also includes a recess 54 receiving a bumper 55 which limits the upward movement of the linkage 32. Bumper 55 is constructed of a resilient material such as a relatively soft plastic or rubber so as to reduce the noise when the linkage engages or bumps against it. Part 33b is a mirror image of part 33a.

A magnetic reed switch 60 or other type of mechanical or electrically actuated switch is mounted in the wall of housing 33, and a magnet 61 or other actuator is mounted on link 38 so that when the toggle linkage is in unlocked position, the switch 60 is actuated to control the energization or de-energization of an ignition control module. An example of such an ignition control module is disclosed in U.S. Pat. No. 5,096,033 previously referred to.

FIG. 8 discloses substantially the same structure as FIG. 5 but includes a spring 56 mounted in the recess 54 and abutting the knee of the toggle linkage 32. Spring 56 assists in the movement of the toggle linkage downwardly and also provides a bumper-like effect.

An important part of the present invention is the link 40 which is also the actuator member that actuates the toggle linkage 32. Link or actuator member 40 includes legs 40a and 40b pivoted by pin 41a about the axis "Y" to the links 38 and 39. Link 40 extends downwardly and includes a free end 46 in which is embedded the permanent magnet 45 that is magnetized to produce a south pole.

As disclosed in FIG. 6, the magnet 45 is offset from the extreme end of bottom 46 a distance "d," which we have found should be approximately 0.010 inch. We have discovered that if magnet 45 contacts core 37 after several thousand cycles, the magnet may disintegrate because of the hammering effect on core 37. With the preferred construction, the magnet always has a slight air gap between it and core 37. As will now be explained, magnet 45 is attracted or repelled, depending upon the polarity of the metal core 37 constituting a part of the module 30 as will now be explained.

The module 30 also includes a housing 34 which contains the coil 35 and metal core 36. Core 37 is an unmagnetized metal part which is neutral and, therefore, magnet 45 is attracted to the core 37, as disclosed in FIG. 2, thus urging the toggle joint 32 downwardly into the position as disclosed in FIG. 2. However, when the coil 35 is energized, it magnetizes core 37 creating a south pole at its top end which repels magnet 45, thus forcing magnet 45 and the link 40, to which it is attached, upwardly to the position as disclosed in FIG. 3 wherein the knee of the toggle linkage engages the bumper. In this position, the locking pin 24 is withdrawn out of the recess 25 of pawl 18 permitting the operator of the shifter to depress pawl actuator 18 to move pawl 19 out of the park slot "P."

It should be understood that magnet 45 could be a north pole in which event core 37 would be magnetized to produce a north pole at its top end. The important factor is that when the coil 35 is energized, the poles of magnet 45 and the top of core 37 are like each other and therefore, repell each other.

OPERATION

Having described the structure of our invention, the operation of the same should be evident. Referring to FIG. 2, it shows the module 30 in locked position, that is, with the locking member or pin 24 extending into the notch or groove 25 of the pawl actuator 18. In this position, the links 38, 39, and 40 are positioned with the axis "Y" located a slight distance above the center line "CL." This position is obtained and retained by reason of the magnet 45 which has a south pole being attracted to the core 37. In this position, the pin or locking member 24 prohibits the pawl actuator 18 from being pushed downwardly by the vehicle operator so that the pawl 19 prevents the shifter from being shifted out of the park "P" slot. The position of the axis "Y" only slightly above the center line "CL" requires a tremendous force to be exerted longitudinally on the locking member 24 in order to break the knee of the toggle joint 32. Thus, the driver is unable to actuate the pawl 18 by depressing plunger 15.

When the driver applies the brake, the coil 35 is energized causing the top end of the core 37 to be a south pole, i.e., like that of magnet 45. As a result, the south pole at the top end of core 37 repels the south pole of the magnet 45 embedded in the end of the link 40. The link 40 is thus forced upwardly, as disclosed in FIG. 3, to the position against the bumper 55 having an elastomeric surface to provide a soft contact. As previously explained, the bumper 55 reduces any clicking noise which might result when the toggle joint 2 reaches its upper position as disclosed in FIG. 3.

When forced into the position of FIG. 3, the toggle joint 32 pulls the locking member or pin 24 out of the recess 25 of the pawl actuator 18. Regardless of whether the pin 24 is pulled completely out of the recess 25 by forcing the toggle joint upwardly, the movement of the toggle upwardly will greatly reduce the holding force on pin 24, permitting the operator of the vehicle to force the pin 24 out of locked position. As previously explained, this results by virtue of the restraining force of the toggle joint 32 being greatly reduced as the axis "Y" is moved upwardly by the repelling magnetic force of the core 37.

It may sometimes occur that the driver will push the button 15 before he applies the brakes. This will cause the pawl actuator to exert a force on the pin 24 prior to the time that the coil 35 is energized. This force exerted by the pawl actuator against the pin 24 may cause some binding of the pin 24 within the opening 50 in which it slides thereby requiring a greater magnetic force than provided by the repelling force of the core 37. The occurrence of such binding is easily eliminated by the driver releasing the force on the button 15 to erase any binding and continuing to apply the brakes in which event the link 40 is forced upwardly to the position of FIG. 3 by the repelling magnetic force of the core 37 created by the energization of the coil 35.

From the foregoing description, it may readily be observed by those skilled in the art that the present invention provides a novel lockout mechanism for an automatic shifter wherein the shifter is locked into park position unless the brake is applied. Those skilled in the art, of course, will appreciate the many advantages of the present invention over that shown in the prior art and will also recognize that many modifications can be made without departing from the concept and spirit of the invention.

The embodiments of the invention in which an exclusive property or privilege is claimed are defined as follows:

1. In a vehicle transmission shifter mechanism for a vehicle having a brake, said vehicle transmission shifter mechanism having a brake/park/lock mechanism for preventing the shifting of said transmission shifter from park position to another gear position unless the brakes of the vehicle are applied;

a shifting lever movable from a park position to at least one other gear position;

a detent element associated with said shifting lever for releasably holding said lever in said park position;

an actuator for releasing said shifting lever for movement to said other gear position;

an electrically operated control module including a pin movable between a locked position to an unlocked position, said control module being controlled by a driver applying the brakes of the vehicle in which said vehicle transmission shifter mechanism is mounted whereby when the brakes are not applied, said pin is urged to said locked position and when the brakes are applied, said pin is urged to the unlocked position;

said control module including an electrical coil capable of being in an energized or de-energized state and an actuator member movable in response to energization of said coil, the improvement comprising:

a toggle joint operatively connecting said actuator member to said pin;

a metal core proximate and electrical coil and said actuator member; and said actuator member having a magnetic force associated therewith so as to be attracted to said metal core when said coil is in one of said energized or de-energized state to urge such pin to the locked position, and repelled by said metal core when said coil is in the other of said energized or de-energized state to urge said pin to the unlocked position.

2. The shifter of claim 1 in which said toggle joint means includes a first link and a second link, one end of said first link being pivotally connected to one end of said second link providing a knee; the other end of said first link being pivoted about a fixed axis and the other end of said second link being pivotally connected about a movable axis to one end of said pin whereby the positions of said knee correspond to the locked and unlocked positions of said pin; and said actuator member being operatively connected to said first and second links at said knee.

3. The shifter of claim 2 in which said actuator member is a third link connected directly to said knee and containing a magnet being attracted to said core when the coil is in the de-energized state and repelled by said core when the coil is in the said energized state.

4. The shifter of claim 1 in which the shifting lever is a tube having a pawl actuator slidably extending axially through at least a portion of the inner passageway of said tube; said pin in its locked position extending into said passageway into the path of the pawl actuator.

5. The shifter of claim 4 in which the control module including said toggle mechanism is located in a housing supported on said tube; said housing and said tube having aligned openings to accommodate the movement of said pin in and out of the path of said pawl actuator.

6. The shifter of claim 1 in which said actuator member extends substantially perpendicular to the axis of said pin; and each of said first and second links in the locked position of said pin extend at a slight angle away from said core and the axis of said pin and, in the unlocked position of said pin, extend at a greater angle away from said core and axis of said pin.

7. The shifter of claim 4 in which said pin extends and is movable substantially perpendicular to the axis of said tube.

8. A vehicle transmission shifter for a vehicle having a vehicle condition responsive means responsive to a first condition and a second condition of said vehicle, said vehicle transmission shifter having a locking member for preventing the shifting of said transmission shifter from park position to another gear position when the first condition of the vehicle exists, comprising:

a shifting lever movable from a park position to at least one other gear position;

a detent member associated with said shifting lever for releasably holding said lever in said park position;

an actuator for releasing said shifting lever for movement to said other gear position;

an electrically operated control module including said locking member movable between a locked position to an unlocked position, said control module being controlled by the first and second condition of the vehicle in which said vehicle transmission shifter is mounted whereby when the vehicle is in the first condition, said locking member is urged to said locked position and when the vehicle is in the second condition, said locking ember is urged to the unlocked position;

said control module including an electrical coil capable of being in an energized or de-energized state and an actuator member movable in response to energization of said coil, the improvement comprising:

a toggle joint operatively connecting said actuator member to said locking member;

a metal core proximate said electrical coil and said actuator member; and said actuator member having a magnetic force associated therewith so as to be attracted to said metal core when said coil is in one of said de-energized or energized state to urge said locking member to locked position and repelled when in the other of said de-energized or energized state to urge said locked member to the unlocked position.

9. The shifter of claim 8 in which said toggle includes a first link and a second link, one of said first links being pivotally connected to one end of said second link providing a knee; the other end of said first link being pivoted about a fixed axis and the other end of said second link being pivotally connected about a movable axis to one end of said locking member whereby the positions of said knee correspond to the locked and unlocked positions of said locking member; and said actuator member being operatively connected to said first and second links at said knee.

10. The shifter of claim 9 in which said actuator member is connected directly to said knee by a third link.

11. The shifter of claim 8 in which the shifting lever is a tube having a pawl actuator slidably extending axially through at least a portion of the inner passageway of said tube; said locking member being elongated along an axis and in its locked position extending into said passageway into the path of the pawl actuator.

12. The shifter of claim 9 in which the shifting lever is a tube having a pawl actuator slidably extending axially through at least a portion of the inner passageway of said tube; said locking member being elongated along an axis and in its locked position extending into said passageway into the path of the pawl actuator.

13. The shifter of claim 11 in which the control module including said toggle mechanism is located in a housing supported on said tube; said housing and said tube having aligned openings to accommodate the movement of said locking member in and out of the path of said pawl actuator.

14. The shifter of claim 8 in which said actuator member extends substantially perpendicular to the axis of said locking member; and each of said first and second links in the locked position of said locking member extend at a slight angle away from said core and the axis of said locking member and in the unlocked position of said locking member extend at a greater angle away from said core and axis of said locking member.

15. A vehicle transmission shifter for a vehicle having a vehicle condition responsive means responsive to a first condition and a second condition of said vehicle, said vehicle transmission shifter having a locking member for preventing the shifting of said transmission shifter from park position to another gear position when the first condition of the vehicle exists, comprising:

a shifting lever movable from a park position to at least one other gear position;

a detent member associated with said shifting lever for releasably holding said lever in said park position;

an actuator means for releasing said shifting lever for movement to said other gear position;

an electrically operated control module including said locking member movable along a line between a locked position to an unlocked position, said control module being controlled by the first and second condition of the vehicle in which said vehicle transmission shifter is mounted whereby when the vehicle is in the first condition, said locking member is urged along said line in a first direction to said locked position and when the vehicle is in the second condition, said locking member is urged along said line in a second direction opposite to said one direction to the unlocked position; the improvement comprising:

said control module including mechanical advantage means for exerting forces on said locking member along said line in either of said first or second directions; and an actuator member operatively connected to said mechanical advantage means for exerting a force on said mechanical advantage means in a direction orthogonal to said first and second directions;

a magnetic force associated with said actuator members;

said magnetic force adapted to exert on said actuator member a magnetic attracting and repelling force; and one of said magnetic attracting or retracting force causing said locking member to move and be held in a locked position and the other of said magnetic attracting or retracting force causing said locking member to be moved to an unlocked position.

16. The vehicle transmission shifter of claim 15 in which said mechanical advantage means includes an elongated mechanism pivotally mounted at one end on a fixed axis located on said line and secured to said locking member at its other end, said other end being movable with said locking member along said line, said elongated mechanism having an intermediate portion movable intermediate said ends in a direction substantially orthogonal to said direction of said line and responsive to the movement of said locking member along said line and vice versa; said actuator member being operatively connected to said intermediate portion for restraining the movement of said locking member when said ends and intermediate portion are substantially aligned and said locking member is in locked position, and for moving said locking member when said intermediate portion is spaced from said line in a direction toward said actuator member and force is applied by said actuator member to said intermediate portion.

17. The vehicle shifter mechanism of claim 15 in which the mechanical advantage means is a toggle joint.

18. The vehicle shifter mechanism of claim 16 in which the mechanical advantage means is a toggle joint.

19. The shifter of claim 17 in which said toggle joint includes a first link and a second link, one of said first links being pivotally connected to one end of said second link providing a knee; the other end of said first link being pivoted about a fixed axis and the other end of said second link being pivotally connected about a movable axis to one end of said locking member whereby the positions of said knee correspond to the locked and unlocked positions of said locking member; and said actuator member being operatively connected to said first and second links at said knee.

20. The shifter of claim 18 in which said toggle joint includes a first link and a second link, one of said first links being pivotally connected to one end of said second link providing a knee; the other end of said first link being pivoted about a fixed axis and the other end of said second link being pivotally connected about a movable axis to one end of said locking member whereby the positions of said knee correspond to the locked and unlocked positions of said locking member; and said actuator member being operatively connected to said first and second links at said knee.

21. The shifter of claim 19 in which said actuator member is a third link connected directly to said knee and said magnetic attracting and repelling force is created by a permanent magnet on said third link and an electrical coil and a metal core located proximate thereto, said coil being capable of being either energized or de-energized for repelling or attracting said magnet.

22. The shifter of claim 20 in which said actuator member is connected directly to said knee by a third link.

23. In a vehicle transmission shifter mechanism for a vehicle having a brake, said vehicle transmission shifter mechanism having a brake/park/lock mechanism for preventing the shifting of said transmission shifter from park position to another gear position unless the brakes of the vehicle are applied;

a shifting lever movable from a park position to at least one other gear position;

a detent element associated with said shifting lever for releasably holding said lever in said park position;

an actuator for releasing said shifting lever for movement to said other gear position;

an electrically operated control module including a pin movable between a locked position to an unlocked position, said control module being controlled by a driver applying the brakes of the vehicle in which said vehicle transmission shifter mechanism is mounted whereby when the brakes are not applied, said pin is urged to said locked position and when the brakes are applied, said pin is urged to the unlocked position;

said control module including an electrical coil capable of being in an energized or de-energized state and an actuator member movable in response to energization of said coil, the improvement comprising:

a toggle joint operatively connecting said actuator member to said pin.

24. The shifter of claim 23 in which said toggle joint means includes a first link and a second link, one end of said first link being pivotally connected to one end of said second link providing a knee; the other end of said first link being pivoted about a fixed axis and the other end of said second link being pivotally connected about a movable axis to one end of said pin whereby the positions of said knee correspond to the locked and unlocked positions of said pin; and said actuator member being operatively connected to said first and second links at said knee.

25. The shifter of claim 24 in which said actuator member includes a third link connected to said knee.

26. A vehicle transmission shifter for a vehicle having a vehicle condition responsive means responsive to a first condition and a second condition of said vehicle, said vehicle transmission shifter having a locking member for preventing the shifting of said transmission shifter from park position to another gear position when the first condition of the vehicle exists, comprising:

a shifting lever movable from a park position to at least one other gear position;

a detent element associated with said shifting lever for releasably holding said lever in said park position;

an actuator for releasing said shifting lever for movement to said other gear position;

an electrically operated control module including said locking member movable along a line between a locked position to an unlocked position, said control module being controlled by the first and second condition of the vehicle in which said vehicle transmission shifter is mounted whereby when the vehicle is in the first condition, said locking member is urged along said line in a first direction to said locked position and when the vehicle is in the second condition, said locking member is urged along said line in a second direction opposite to said one direction to the unlocked position; the improvement comprising:

said control module including mechanical advantage means for exerting forces on said locking member along said line in either of said first or second directions; and an actuator member operatively connected to said mechanical advantage means for exerting a force on said mechanical advantage means in a direction orthogonal to said first and second directions, said force exerted by said mechanical advantage means on said locking member along said line is substantially greater than the force exerted by said actuator member on said mechanical advantage means.

27. The vehicle transmission shifter of claim 26 in which said mechanical advantage means includes an elongated mechanism pivotally mounted at one end on a fixed axis located on said line and secured to said locking member at its other end, said other end being movable with said locking member along said line, said elongated mechanism having an intermediate portion movable intermediate said ends in a direction substantially orthogonal to said direction of said line and responsive to the movement of said locking member along said line and vice versa; said actuator member being operatively connected to said intermediate portion for restraining the movement of said locking member when said ends and intermediate portion are substantially aligned and said locking member is in locked position, and for moving said locking member when said intermediate portion is spaced from said line in a direction toward said actuator member and force is applied by said actuator member to said intermediate portion.

* * * * *